United States Patent [19] [11] 3,890,291
Vogt et al. [45] June 17, 1975

[54] ALPHA-HYDROXYACRYLIC ACID/ACRYLIC ACID-COPOLYMERS AND A PROCESS FOR MAKING THEM

[75] Inventors: Wilhelm Vogt, Hurth-Efferen; Eberhard Auer, Erftstadt Liblar; Gunter Lenz, Frechen-Bachem; Karl Merkenich, Hurth-Efferen; Klaus Henning, Hurth-Hermulheim, all of Germany

[73] Assignee: Hoechst Aktiengesellschaft, Germany

[22] Filed: May 22, 1974

[21] Appl. No.: 472,277

[30] Foreign Application Priority Data
May 28, 1973 Germany............................ 2327097

[52] U.S. Cl. ..................... 260/80.3 R; 260/78.3 UA
[51] Int. Cl. ............................................ C08f 15/14
[58] Field of Search ................ 260/78.3 UA, 80.3 R

[56] References Cited
UNITED STATES PATENTS
2,754,291  7/1956  Pollack .............................. 260/89.7
3,642,718  2/1972  Naarman et al. .............. 260/78.3 U OTHER PUBLICATIONS
Mulders, "Sequestering Metal Ions," Chem. Abstracts 77, 128503y (1972).
Solvay et al., "Poly(α-hydroxyacrylic acid) or its salts," Chem. Abstracts 78, 148457k (1973).

*Primary Examiner*—Morris Liebman
*Assistant Examiner*—E. A. Nielsen
*Attorney, Agent, or Firm*—Connolly and Hutz

[57] ABSTRACT

Copolymers made from α-hydroxyacrylic acid and acrylic acid. The copolymers contain between 9 and 85 mol percent of acrylic acid and have a specific viscosity within the range 0.05 to 1.0, determined on a 1 weight percent solution of the copolymers in aqueous 2N-sodium hydroxide solution, at 20°C.

12 Claims, No Drawings

ALPHA-HYDROXYACRYLIC ACID/ACRYLIC ACID-COPOLYMERS AND A PROCESS FOR MAKING THEM

The present invention relates to copolymers from α-hydroxyacrylic acid and acrylic acid, the copolymers containing between about 9 and 85 mol percent of acrylic acid and having a specific viscosity substantially within the range 0.05 and 1.0, determined on a 1 weight percent solution of the copolymers in an aqueous 2N-sodium-hydroxide solution, at 20°C. The present invention also relates to a process for making the above copolymers and to their use as complex formers or sequestering agents.

U.S. Pat. Specification No. 2 754 291, Example 6, describes the preparation of a copolymer from α-chloracrylic acid and acrylic acid. To this end, one mol of monomeric α-chloracrylic acid is blended with one mol of monomeric acrylic acid and the resulting blend is polymerized at 70°C in contact with a benzoyl peroxide catalyst. The resulting reaction product is pulverized, washed with anhydrous ether until free from unreacted starting material, and dried.

German Specification "Offenlegungsschrift" 2 161 727 describes the production of poly-α-hydroxyacrylic acid and its sodium salt, wherein poly-α-chloracrylic acid is dissolved in water and the solution thus obtained is heated to boiling. This results in the formation of a gel solidifying into a mass which is easy to pulverize. By neutralizing the reaction product, the sodium salt of poly-α-hydroxyacrylic acid is obtained in a yield of 100 percent. As reported in German Patent Sepcification "Offenlegungsschrift" 2 161 727, the above salt can be used as an agent sequestering polyvalent metal ions, such as Ca-ions, in water. The salt has a sequestering power of Ca-ions equal, for example, to that of sodium nitrilotriacetate, and greater than that of ammonium polyacrylate, sodium citrate, sodium tartrate or sodium gluconate.

Poly-α-hydroxyacrylic acid or its sodium salt have good sequestering properties, yet they find only limited commercial use because of the relatively high costs which are incurred by their preparation.

The present invention now provides an α-hydroxyacrylic acid/acrylic acid-copolymer of the sodium salt thereof, which unexpectedly has a sequestering power for polyvalent metal ions considerably exceeding that of poly-α-hydroxyacrylic acid or polyacrylic acid or of their alkali metal or ammonium salts. The copolymer of the present invention has a capacity for suspending lime exceeding its stoichiometric capacity significantly. In other words, the copolymer produces and unexpected effect of synergism. It adds to the unobviousness of the present result that the capacity for suspending lime of polyacrylic acid has been reported by P. Berth, G. Jakobi and E. Schmadel in Chemiker Zeitung 95 (1971), pages 548–553, to correspond fairly accurately to the stoichiometric ratio. By partially replacing poly-α-hydroxyacrylic acid by inexpensive acrylic acid, it is possible for the copolymer production costs to be reduced considerably, which is advantageous for the commercial use of the resulting copolymer.

The present invention relates more particularly to α-hydroxyacrylic acid/acrylic acid-copolymers containing between 9 and 85 mol percent of acrylic acid and having a specific viscosity substantially within the range 0.05 and 1.0, determined on a 1 weight percent solution of the copolymers in an aqueous 2N-sodium hydroxide solution, at 20°C.

In accordance with a preferred feature of the present invention, the copolymers contain between 16 and 50 mol percent of acrylic acid and have a specific viscosity substantially within the range 0.1 and 0.8, determined on a 1 weight percent solution of the copolymers in an aqueous 2N-sodium hydroxide solution, at 20°C.

The present invention also relates to the alkali metal and ammonium salts, particularly to the sodium salt, of the α-hydroxyacrylic acid/acrylic acid-copolymer.

The process of the present invention for making α-hydroxyacrylic acid/acrylic acid-copolymers containing substantially between 9 and 85 mol percent of acrylic acid and having a specific viscosity substantially within the range 0.05 and 1.0, determined on a 1 weight percent solution of the copolymers in an aqueous 2N-sodium hydroxide solution, at 20°C, comprises subjecting the halogen atoms of an α-chloracrylic acid/acrylic acid copolymer containing substantially between 9 and 85 mol percent of acrylic acid and having a specific viscosity substantially within the range 0.1 and 1.0, determined on a 1 weight percent solution of the copolymer in dimethyl formamide, at 25°C, to hydrolysis with at least stoichiometric proportions of water at temperatures substantially within the range 80° and 100°C, the hydrolysis being effected with thorough agitation, and separating the resulting hydrolyzate.

Products having very good sequestering properties are obtained with the use of an α-chloracrylic acid/acrylic acid feed copolymer containing between 16 and 50 mol percent of acrylic acid and having a specific viscosity within the range 0.4 and 0.8, determined on a 1 weight percent solution of the copolymer in dimethyl formamide, at 25°C.

The chlorine-containing copolymer should more preferably by hydrolyzed with the use of about 10–15 grams of water, per gram of copolymer. It is also advantageous for the hydrolysis to be effected at temperature within the range 90° and 100°C. A reaction period within the range 2 and 3 hours is normally required for this. It is indispensable for the reaction mixture to be thoroughly stirred during the hydrolysis so as to avoid gel formation. In this manner, a fine pulverulent, readily filterable polymer, which can be transformed into its alkali metal salts by neutralizing it with an alkali metal hydroxide or carbonate, as usual, is obtained immediately after termination of the hydrolysis. The copolymer of the present invention can be separated from the aqueous reaction mixture by filtration or by evaporation of the water, to dryness. Hydrolyzates containing more than 50 mol percent of acrylic acid are water-soluble compounds which are recovered from the aqueous solution by evaporating the water present therein. Copolymers which contain up to 50 mol percent of acrylic acid are insoluble in water and can be separated from the reaction mixture by simple filtration.

The alkali metal and ammonium salts of the copolymers of the present invention are basically readily soluble in water. It is possible for them to be separated from the aqueous phase by precipitation with methanol and filtration of the precipitate, or by any other method commonly used for the separation of alkali metal salts of water-soluble polyelectrolytes from an aqueous solution.

3

The copolymers of the present invention and their alkali metal and ammonium salts are novel compounds, which compare very favorably with known sequestering agents as regards power for sequestering polyvalent metal ions, especially calcium ions. They are accordingly very well adapted for use as builder substances in detergent compositions. The copolymers of the present invention have a capacity for suspending lime which is unexpectedly more than twice as high as the stoichiometric capacity, whereas polyacrylic acid or its sodium salt has a capacity for suspending lime, determined stoichiometrically, substantially identical with the actual value.

Poly-α-hydroxyacrylic acid actually compares slightly more favorable with, yet differs substantially from, the copolymers of the present invention.

The following Examples illustrate the invention.

EXAMPLE 1

A blend of 213 g (2 mols) of α-chloracrylic acid and 1.5 l of benzene was placed in a polymerization vessel, heated therein to 80°C and the heated blend was mixed with 1 g of benzoyl peroxide. Following this, 72 g (1 mol) of acrylic acid was introduced dropwise, within 30 min. and with thorough agitation, into the blend. A further 2 g of benzoyl peroxide was added, the blend was allowed to remain at 80°C over a period of 5 hours, then cooled, and the polymer was filtered off and dried. 286 g of a copolymer containing 24.1 percent of chlorine was obtained. The copolymer contained 34 mol percent of acrylic acid having regard to the fact that traces of HCl gas were set free during the polymerization. The polymer had a specific viscosity of 0.63, determined on a 1 weight percent solution in dimethyl formamide, at 25°C.

The α-hydroxyacrylic acid/acrylic acid copolymer was made by stirring 80 g of the above chlorine-containing copolymer into 800 cc of water and heating it to boiling for 3 hours with thorough agitation. The resulting finely pulverulent hydrolyzate was filtered off and dried. It was obtained in a yield for 55 g.

The polymer had a specific viscosity of 0.34, determined on a 1 weight percent solution of the polymer in aqueous 2N-NaOH, at 20°C.

EXAMPLE 2

A blend of 213 g (2 mols) of α-chloracrylic acid, 14.4 g (0.2 mol) of acrylic acid and 2 l of Essovarsol (this is a mineral oil fraction boiling within the limits of 144° and 175°C, marketed by Esso) was placed in a polymerization vessel, heated to 80°C therein and mixed with 2.13 g of benzoyl peroxide. The blend was stirred for 5 hours at 80°C, allowed to cool and the resulting polymer was filtered off. The polymer was washed with a low-boiling petroleum ether and dried. 222 g of a polymer containing 28.6 percent of chlorine and 9 mol percent of acrylic acid was obtained.

140 g of the polymer so made was stirred into 1.5 l of boiling water and made into an α-hydroxyacrylic acid-containing polymer, as described in Example 1. The polymer was obtained in a yield of 86 g. It had a specific viscosity of 0.15, determined on a 1 weight percent solution of the polymer in 2N-NaOH, at 20°C.

EXAMPLE 3 – 5

The procedure was the same as that described in Example 2 save that different proportions of acrylic acid and initiator were used. The results obtained are indicated in the following Table:

Table 1

| Example | 3 | 4 | 5 |
|---------|------|------|------|
| A | 28.8 | 72.0 | 144.0 |
| B | 2.13 | 3.0 | 3.6 |
| C | 236.0 | 280.0 | 353.0 |
| D | 26.7 | 22.5 | 18.3 |
| E | 17.0 | 34.0 | 50.0 |
| F | 0.57 | 0.48 | 0.52 |
| G | 89.0 | 97.0 | 104.0 |
| H | 0.20 | 0.30 | 0.36 |

In the above Table, the letter symbols have the following meanings:

A = Quantity of acrylic acid used, in g
B = Quantity of benzoyl peroxide used, in g
C = Yield of chlorine-containing copolymer, in g
D = Chlorine content of copolymer, in percent
E = Acrylic acid fraction in chlorine-containing copolymer, in mol percent
F = Specific viscosity of polymer, determined on a 1 weight percent solution of the polymer in dimethyl formamide, at 25°C.
G = Yield of hydrolyzed copolymer, in g
H = Specific viscosity of hydrolyzed polymer, determined on a 1 weight percent solution of the polymer in aqueous 2N-NaOH, at 20°C.

EXAMPLE 6

213 g (2 mols) of α-chloracrylic acid was dissolved in a polymerization vessel in 7.5 l of Essovarsol and the solution was heated to 80°C. Following the addition of 3.5 g of benzoyl peroxide, 720 g (10 mols) of acrylic acid was added dropwise within 3 hours with thorough agitation to the solution. In addition to this altogether four 1.5 g portions of benzoyl peroxide were added at intervals of 1 hour. After a reaction period of 8 hours, the polymer was filtered off, washed with a low-boiling petroleum ether and dried.

938 g of a polymer containing 7.5 percent of chlorine and 84 mol percent of acrylic acid was obtained.

The polymer had a viscosity of 0.79, determined on a 1 weight percent solution of the copolymer in dimethyl formamide, at 25°C.

80 g of the copolymer was hydrolyzed by boiling it for 3 hours in 1 l of water and the solution was successively evaporated to dryness.

The hydrolyzate was obtained in a yield of 69 g. The polymer had a viscosity of 0.55, determined on a 1 weight percent solution of the polymer in 2N-aqueous NaOH, at 20°C.

EXAMPLE 7

The hydrolyzed products prepared in the manner described in Examples 1 to 6 were tested as to their capacity for suspending lime (CSL). To this end, an aqueous sodium carbonate-containing solution, which contained about 0.2 weight percent of the hydrolyzed product and had a pH of 10, was titrated with an aqueous 0.05 N calcium acetate solution until it remained turbid. The value determined for the lime suspending capacity indicates the number of milligrams of calcium ions kept in solution by 1 g of the hydrolyzed product.

The stoichiometric capacity for suspending lime of the hydrolyzed products can be calculated along the following formula:

$$CSL = \frac{\text{atomic weight Ca}}{2 \times E} \cdot 1{,}000 = \frac{20{,}000}{E} \frac{mg}{g}$$

wherein E stands for the equivalent weight of the hydrolyzed product, determined by acidimetric titration.

In the following Table 2, the values determined for the capacity for suspending lime of the products of this invention are compared with the values determined for polyacrylic acid and poly-$\alpha$-hydroxyacrylic acid, respectively.

TABLE 2

| Product | E | Capacity for suspending lime | |
| --- | --- | --- | --- |
| | | theoretical | effective |
| Example 1 | 81.4 | 246 | 310 |
| Example 2 | 82.9 | 241 | 409 |
| Example 3 | 82.8 | 242 | 425 |
| Example 4 | 81.5 | 245 | 464 |
| Example 5 | 84.5 | 237 | 684 |
| Example 6 | 74.7 | 268 | 507 |
| Polyacrylic acid | 72.3 | 277 | 274 |
| Poly-$\alpha$-hydroxy-acrylic acid | 82.5 | 242 | 265 |

As results from Table 2, the products of the invention distinguish very favorably in their capacity for suspending lime over the comparative products. More particularly, the present products enable substantially more $Ca^{++}$-ions to be kept in solution.

The poly-$\alpha$-hydroxyacrylic acid used as a comparative product in Table 2 was prepared in the following manner:

a. A blend of 100 g of $\alpha$-chloracrylic acid, 400 cc of benzene and 1 g of benzoyl peroxide was placed in a round flask provided with stirrer and reflux condenser, and heated to boiling therein for 3 hours under nitrogen. The precipitated polymer was separated and dried at 40°C under vacuum. Poly-$\alpha$-chloracrylic acid was obtained in a yield of 100 percent, based on the theoretical.

b. An aqueous solution of poly-$\alpha$-chloracrylic acid saturate at 30°C was prepared and heated to boiling for 2 hours. Precipitating hydrolyzate was washed until free from chloride and dried at 60°C under vacuum. Poly-$\alpha$-hydroxyacrylic acid was obtained in a yield of 77 g or 100 percent of the theoretical. The hydrolyzate had a molecular weight of 2 800 and a sequestering power for lime of 265 mg of Ca/g.

We claim:

1. Copolymers of $\alpha$-hydroxyacrylic acid and acrylic acid, the copolymers containing between about 9 and 85 mol percent of acrylic acid and having a specific viscosity substantially within the range 0.05 and 1.0, determined on 1 weight percent solutions of the copolymers in aqueous 2N-sodium hydroxide solution, at 20°C.

2. The copolymers as claimed in claim 1, containing between 16 and 50 mol percent of acrylic acid and having a specific viscosity substantially within the range 0.1 and 0.8, determined on 1 weight percent solutions of the copolymers in aqueous 2N-sodium hydroxide solution, at 20°C.

3. The alkali metal or ammonium salts of the copolymers as claimed in claim 1.

4. The sodium salts of the copolymers as claimed in claim 3.

5. A process for making $\alpha$-hydroxyacrylic acid/acrylic acid-copolymers containing substantially between 9 and 85 mol percent of acrylic acid and having a specific viscosity substantially within the range 0.05 and 1.0, determined on a 1 weight percent solution of the copolymers in aqueous 2N-sodium hydroxide solution, at 20°C, which comprises subjecting the halogen atoms of an $\alpha$-chloracrylic acid/ acrylic acid-copolymer containing substantially between 9 and 85 mol percent of acrylic acid and having a specific viscosity substantially within the range 0.1 and 1.0, determined on a 1 weight percent solution of the copolymer in dimethyl formamide, at 25°C, to hydrolysis with at least stoichiometric proportions of water at temperatures substantially within the range 80° and 100°C, the hydrolysis being effected with thorough agitation, and separating the resulting hydrolyzate.

6. The process as claimed in claim 5, wherein the $\alpha$-chloracrylic acid/acrylic acid-copolymer contains between 16 and 50 mol percent of acrylic acid and has a specific viscosity within the range 0.4 and 0.8, determined on a 1 weight percent solution of the copolymer in dimethyl formamide, at 25°C.

7. The process as claimed in claim 5, wherein the hydrolysis is effected with the use of between about 10 and 15 g of water, per gram of copolymer.

8. The process as claimed in claim 5, wherein the hydrolysis is effected at temperatures within the range 90° and 100°C.

9. The process as claimed in claim 5, wherein the hydrolysis is effected within the range 2 and 3 hours.

10. The process as claimed in claim 5, wherein the $\alpha$-hydroxyacrylic acid/acrylic acid-copolymer is separated from aqueous reaction mixture by filtration or by evaporation of water to dryness.

11. Complex formers and/or sequestering agents for polyvalent metal ions, consisting essentially of the copolymers as claimed in claim 1.

12. Complex formers and/or sequestering agents for Ca-ions, Mg-ions or Cu-ions, consisting essentially of the copolymers as claimed in claim 11.

* * * * *